(12) United States Patent
Lee et al.

(10) Patent No.: US 9,893,484 B2
(45) Date of Patent: Feb. 13, 2018

(54) MEMORY CARD ADAPTOR HAVING AN OPENING TO EXPOSE A TERMINAL OF A MEMORY CARD

(71) Applicant: Samsung Electronics Co., Ltd., Suwon-si, Gyeonggi-do (KR)

(72) Inventors: In-Jae Lee, Hwaseong-si (KR); Yong-Nam Koh, Suwon-si (KR); Ki-Woong Yoo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/612,012

(22) Filed: Jun. 2, 2017

(65) Prior Publication Data

US 2017/0352998 A1 Dec. 7, 2017

(30) Foreign Application Priority Data

Jun. 2, 2016 (KR) ........................ 10-2016-0068853

(51) Int. Cl.
*H01R 27/02* (2006.01)
*H01R 31/06* (2006.01)
(Continued)

(52) U.S. Cl.
CPC .......... *H01R 31/06* (2013.01); *G06F 13/4068* (2013.01); *H01R 12/7005* (2013.01); *H01R 12/721* (2013.01)

(58) Field of Classification Search
CPC ....... G06K 19/07739; G06K 19/07732; G06K 19/07743; G06K 19/07741; G06K 7/0021;
(Continued)

(56) References Cited

U.S. PATENT DOCUMENTS 6,558,199 B2 * 5/2003 Oguchi ............... H01R 12/721
439/630
6,873,824 B2 * 3/2005 Flick .................. G07C 9/00182
340/426.3
(Continued)

FOREIGN PATENT DOCUMENTS

JP  2000-276573 A    10/2000
JP  2000293772 A  * 10/2000
(Continued)

*Primary Examiner* — James Harvey
*Assistant Examiner* — Matthew T Dzierzynski
(74) *Attorney, Agent, or Firm* — Myers Bigel, P.A.

(57) ABSTRACT

A memory card adaptor is provided herein. The memory card adaptor may include a housing having a slot configured to accommodate a memory card. The memory card may include a signal terminal and non-signal terminals. For example, the signal terminal may be a high-speed and/or data transfer terminal, and the non-signal terminal may be a power or voltage terminal. The signal terminal may be at least partially exposed via a signal terminal opening in the housing when the memory card is accommodated in the slot. The memory card adaptor may also include at least one card-side terminal arranged so as to be capable of contacting at least one of the non-signal terminals. The at least one card-side terminal may be electrically connected, for example via a wiring line, to at least one socket-side terminal arranged so as to be capable of contacting terminals of a host socket 20 Claims, 15 Drawing Sheets

(51) Int. Cl.
*G06F 13/40* (2006.01)
*H01R 12/70* (2011.01)
*H01R 12/72* (2011.01)

(58) Field of Classification Search
CPC .. G06K 13/085; G06K 7/0043; H05K 5/0282; H01R 27/02
USPC ............................ 439/630, 945, 946, 60, 632
See application file for complete search history.

(56) References Cited

U.S. PATENT DOCUMENTS

| | | | | |
|---|---|---|---|---|
| 6,967,575 B1 * | 11/2005 | Dohrmann | ............ | A47G 29/141 |
| | | | | 220/592.01 |
| 7,012,503 B2 | 3/2006 | Nielsen | ............... | G07C 9/00103 |
| | | | | 340/5.6 |
| 7,094,106 B2 * | 8/2006 | Yamamoto | ....... | G06K 19/07732 |
| | | | | 439/159 |
| 7,255,606 B2 * | 8/2007 | Tanaka | ............. | G06K 19/07735 |
| | | | | 439/630 |
| 7,300,296 B1 * | 11/2007 | Tanaka | ................. | G06K 7/0021 |
| | | | | 439/159 |
| 7,314,388 B2 * | 1/2008 | Yamada | ............... | G06K 7/0021 |
| | | | | 361/737 |
| 7,320,622 B2 * | 1/2008 | Ying | ...................... | H01R 13/22 |
| | | | | 439/630 |
| 7,341,194 B2 | 3/2008 | Lin | | |
| 7,371,119 B1 * | 5/2008 | Lee | ........................ | G06K 7/0043 |
| | | | | 439/630 |
| 7,375,958 B2 * | 5/2008 | Kuroda | ................ | H05K 5/0282 |
| | | | | 361/679.32 |
| 7,771,238 B2 | 8/2010 | Aoki et al. | | |
| RE42,410 E * | 5/2011 | Yamada | ................ | G06K 7/0021 |
| | | | | 361/737 |
| 8,102,658 B2 * | 1/2012 | Hiew | .................... | G06F 1/1632 |
| | | | | 235/492 |
| 9,202,160 B2 * | 12/2015 | Han | .................. | G06K 19/07739 |
| 9,722,653 B2 * | 8/2017 | Han | ..................... | H04B 1/3816 |
| 2004/0043791 A1 * | 3/2004 | Reddy | ............... | H04L 29/12009 |
| | | | | 455/558 |
| 2007/0274033 A1 * | 11/2007 | Hwang | .................. | G06F 1/186 |
| | | | | 361/679.32 |
| 2010/0025480 A1 | 2/2010 | Nishizawa et al. | | |
| 2012/0298759 A1 | 11/2012 | Chen | | |

FOREIGN PATENT DOCUMENTS

| | | |
|---|---|---|
| JP | 2005-293144 A | 10/2005 |
| JP | 2007-011688 A | 1/2007 |
| KR | 10-1002739 | 12/2010 |
| KR | 10-1460076 | 11/2014 |

* cited by examiner

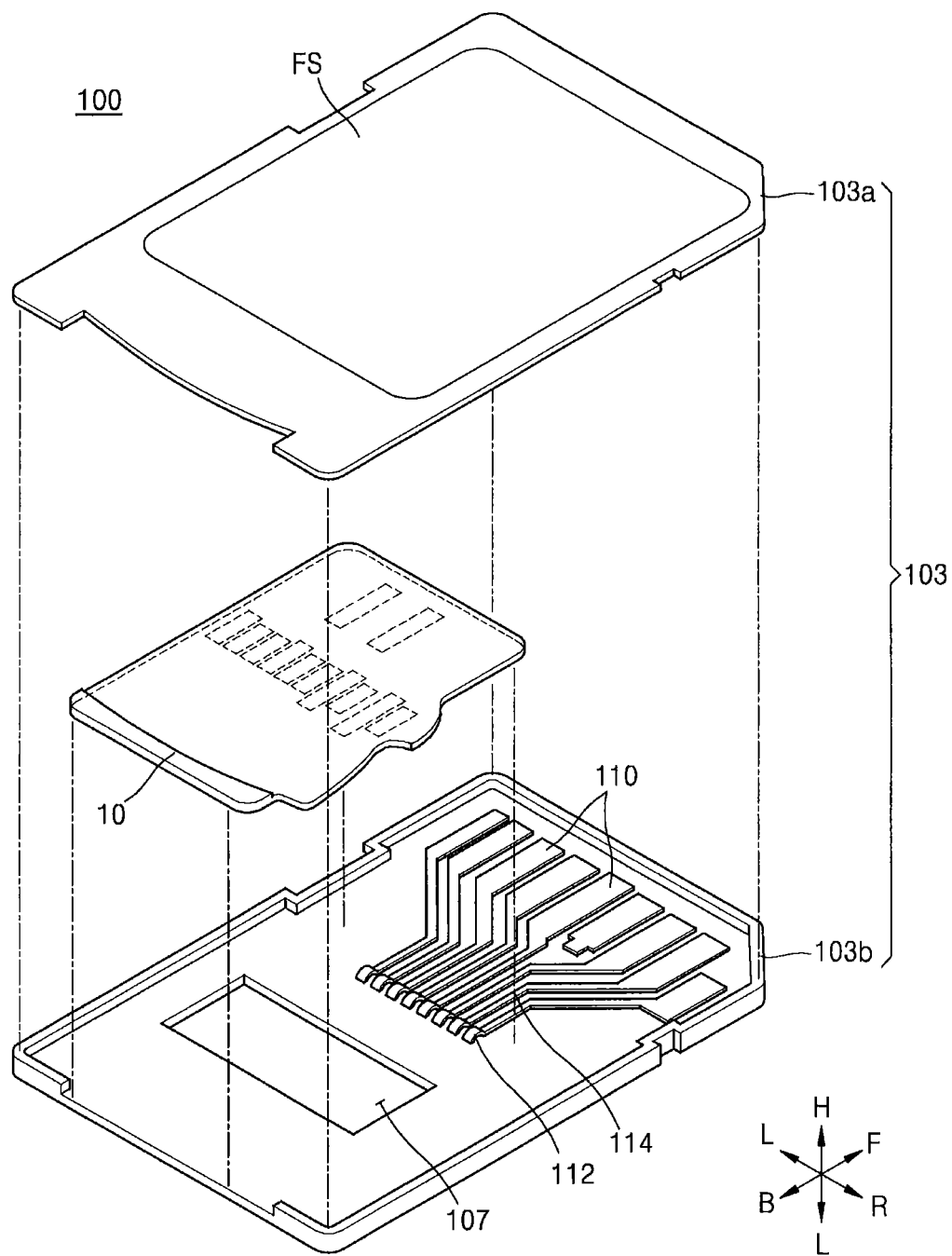

MEMORY CARD ADAPTOR HAVING AN OPENING TO EXPOSE A TERMINAL OF A MEMORY CARD

CROSS-REFERENCE TO RELATED APPLICATION

This application claims the benefit of Korean Patent Application No. 10-2016-0068853, filed on Jun. 2, 2016, in the Korean Intellectual Property Office, the disclosure of which is incorporated herein in its entirety by reference.

TECHNICAL FIELD

The present disclosure relates to a memory card adaptor, and more particularly, to a memory card adaptor having improved signal-transmitting characteristics, improved compatibility with a socket of a different type, and fewer electrical shorts.

BACKGROUND

With the development of technology related to storage media, various types of memory devices (for example, non-volatile memory devices) may be used as auxiliary storages of portable devices such as cell phones or digital cameras. Examples of various types of memory devices include CompactFlash cards, multimedia cards, Secure Digital (SD) cards, and the like.

Memory cards and memory devices may have various standards, and may have forms or dimensions that differ from each other according to the type. Adaptors for accommodating memory cards that have various forms or dimensions may be desirable. As data transmission speeds increase, research into methods or structures for decreasing problems related to transmission loss and malfunction of host devices and/or memory cards has been actively carried out.

SUMMARY

The present disclosure provides a memory card adaptor having improved signal-transmitting characteristics, improved compatibility with a socket of a different type, and fewer electrical shorts.

According to an aspect of the present disclosure, there is provided a memory card adaptor including: a housing; a slot in the housing dimensioned to accommodate a memory card including a signal terminal and non-signal terminals; a signal terminal opening in the housing that is configured to at least partially expose the signal terminal when the memory card is accommodated in the slot; at least one card-side terminal arranged so as to be capable of contacting at least one of the non-signal terminals; at least one socket-side terminal arranged so as to be capable of contacting terminals of a host socket, and corresponding to the at least one card-side terminal; and a wiring line that connects the at least one card-side terminal and the at least one socket-side terminal that correspond to each other.

According to another aspect of the present disclosure, there is provided a memory card adaptor including: a first surface and a second surface which are two main surfaces of the memory card adaptor; a slot between the first surface and the second surface, the slot dimensioned to accommodate a micro universal flash storage (UFS) memory card that is inserted into the slot; a signal terminal opening, in the first surface, that exposes signal terminals of the micro UFS memory card that is inserted in the slot; and a socket-side terminal, on the first surface, that is electrically connected to a non-signal terminal of the micro UFS memory card that is inserted in the slot.

BRIEF DESCRIPTION OF THE DRAWINGS

Embodiments of the inventive concept will be more clearly understood from the following detailed description taken in conjunction with the accompanying drawings in which:

FIG. 3 is an exploded perspective view illustrating the memory card adaptor of FIGS. 1A and 1B, together with a memory card;

DETAILED DESCRIPTION OF THE DRAWINGS

Figure 1A:
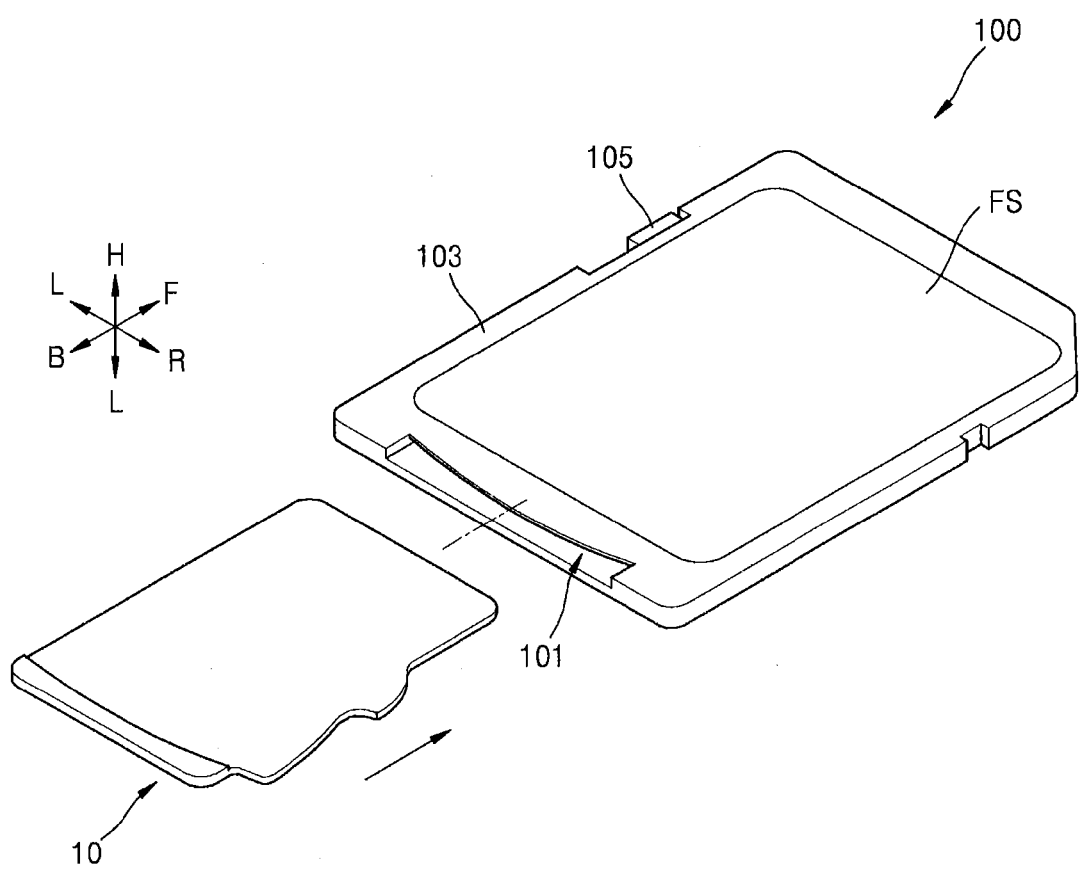
FIGS. 1A and 1B are perspective views respectively illustrating the front and the rear of a memory card adaptor according to an embodiment.

Various example embodiments will now be described more fully with reference to the accompanying drawings in which some example embodiments are shown. However, the aspects of the present disclosure illustrated in the drawings may be embodied in many alternate forms and should not be construed as limited to only the example embodiments set forth therein.

Figure 1B:
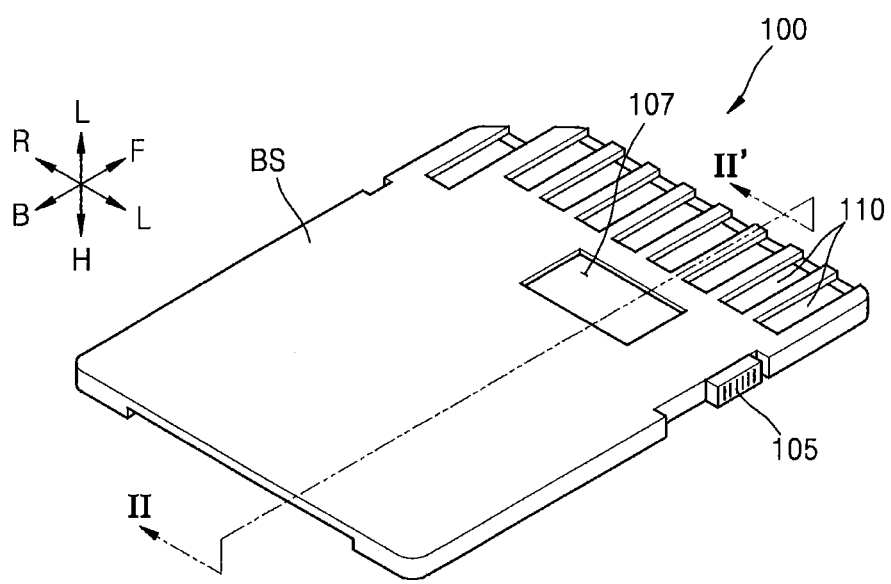

FIGS. 1A and 1B are perspective views respectively illustrating the front and the rear of a memory card adaptor 100 according to an embodiment.

In FIGS. 1A and 1B, an HL direction denotes an up-and-down direction, an FB direction denotes a front-and-back direction, and an LR direction denotes a left-and-right direction. In this regard, particularly, the FB direction may be insertion and withdrawal directions of a memory card 10 into and out of the memory card adaptor 100.

Referring to FIGS. 1A and 1B, the memory card adaptor 100 may include a slot 101 into which the memory card 10 may be inserted, a housing 103, socket-side terminals 110, and a write protection knob 105. As illustrated in FIG. 1A, the memory card 10 may be inserted into the slot 101 in the FB direction and be partially or completely accommodated in the memory card adaptor 100.

As described above, the memory card 10 may be inserted into the memory card adaptor 100, and thus, data input and output between a host (not shown) and the memory card 10 may pass through a socket dimensioned to receive the dimensions and the terminal arrangement of the memory card adaptor 100.

Although the socket-side terminals 110 of the memory card adaptor 100 are illustrated as being similar to terminals of a Secure Digital (SD) card, this is just an example, and the present disclosure is not limited thereto. In addition, although the memory card 10 is illustrated as being similar to a micro SD card, this is just an example, and the present disclosure is not limited thereto.

The memory card adaptor 100 may have a first surface BS and a second surface FS that are on opposite sides of memory card adaptor 100 as main surfaces. In some arrangements, first surface BS may be a back surface of the memory card adaptor 100, and second surface FS may be a front surface of the memory card adaptor 100. The socket-side terminals 110 may be on the first surface BS of the memory card adaptor 100. When the memory card adaptor 100 is inserted in a host socket (not shown), the socket-side terminals 110 may physically contact corresponding terminals (not shown) of the host socket directly.

In addition, a signal terminal opening 107 may be on the first surface BS. The signal terminal opening 107 may be configured to expose a signal terminal of the memory card 10 when the memory card 10 is inserted in the memory card adaptor 100. That is, the signal terminal opening 107 may be in a position that corresponds to that of the signal terminal of the memory card 10 when the memory card 10 is inserted in the memory card adaptor 100.

Figure 1C:
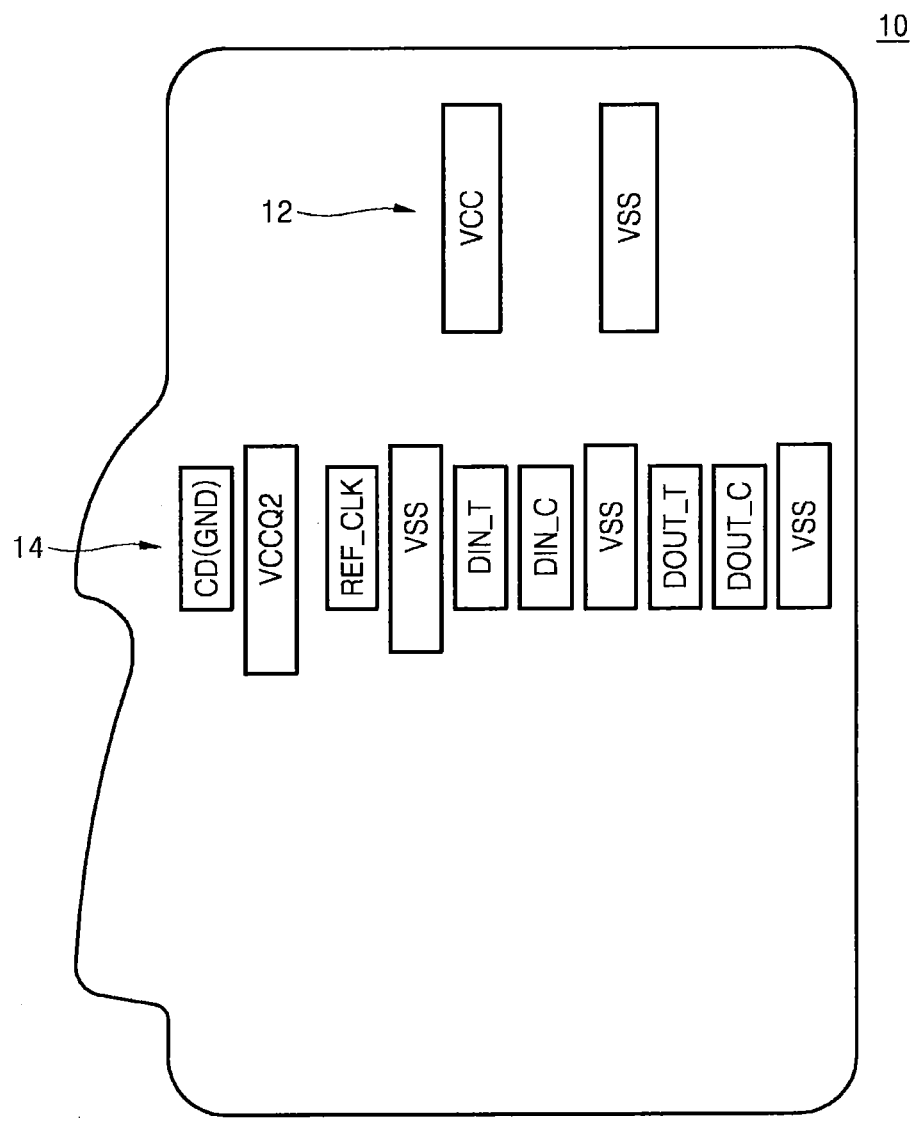
FIG. 1C is a front view of a main configuration of a micro universal flash storage (UFS) memory card that includes a pin arrangement, according to aspects of the present disclosure.

In this regard, the memory card 10 may be, for example, a micro universal flash storage (UFS) memory card. FIG. 1C is a front view of a main configuration of a micro UFS memory card that includes a pin arrangement according to one or more aspects of the present disclosure.

Referring to FIG. 1C, terminals of the memory card 10 may be arranged in two rows. That is, the memory card 10 may include first row terminals 12 that are closer to a front end of the memory card 10 and second row terminals 14 that are closer to a rear end of the memory card 10. The number and arrangement of the terminals and of the rows of terminals illustrated in FIG. 1C are merely exemplary.

The first row terminals 12 may include a power terminal VCC of a first voltage and a ground terminal VSS. The first voltage that is applied to the power terminal VCC of the first voltage may have, for example, a value of about 3.0 V to about 3.5 V. The first voltage may be supplied to semiconductor devices, such as non-volatile memory devices, that perform low-speed operations from among semiconductor devices in the memory card 10.

The second row terminals 14 may include a power terminal VCCQ2 of a second voltage, and the second voltage may have, for example, a value of about 1.5 V to about 2.2 V. The second voltage may be supplied to semiconductor devices, such as memory controllers, that perform high-speed operations from among semiconductor devices in the memory card 10.

The second row terminals 14 may have ground terminals VSS. In addition, the second row terminals 14 may have a pair of data input terminals DIN_C and DIN_T and a pair of data output terminals DOUT_C and DOUT_T. Although FIG. 1C illustrates the pair of data input terminals DIN_C and DIN_T as being closer to the center of the memory card 10 than the pair of data output terminals DOUT_C and DOUT_T, locations of the pair of data input terminals DIN_C and DIN_T and the pair of data output terminals DOUT_C and DOUT_T are merely exemplary, may be switched with each other.

The pair of data input terminals DIN_C and DIN_T and the pair of data output terminals DOUT_C and DOUT_T may respectively constitute two-channel input terminals and two-channel output terminals.

The pair of data input terminals DIN_C and DIN_T and the pair of data output terminals DOUT_C and DOUT_T may each be electrically shielded by the ground terminals VSS that are adjacent thereto in a left-and-right direction of FIG. 1C. Due to the shielding, data may be stably inputted and outputted thereto and therefrom. For example, data may be inputted via DIN_C and DIN_T and outputted via DOUT_C and DOUT_T.

The second row terminals 14 may have a reference clock terminal REF_CLK. A clock signal having, for example, a frequency of about 26 MHz may be provided to the reference clock terminal REF_CLK. The reference clock terminal REF_CLK may be disposed adjacent to the pair of data input terminals DIN_C and DINT with one ground terminal VSS therebetween. Through the configuration described above, the reference clock terminal REF_CLK may be electrically shielded from signal input and output of the data input and output terminals DIN_C, DIN_T, DOUT_C, and DOUT_T, and thus, stable operation of the reference clock terminal REF_CLK may be achieved.

In addition, the power terminal VCCQ2 of the second voltage may be at a side of the reference clock terminal REF_CLK.

A card detection terminal CD may be disposed in a side direction of the power terminal VCCQ2 of the second voltage. The card detection terminal CD may be a terminal via which a host may determine a type of the memory card 10. Particularly, the card detection terminal CD may be electrically connected to a ground line of the memory card 10.

The pair of data input terminals DIN_C and DIN_T, the pair of data output terminals DOUT_C and DOUT_T, and the reference clock terminal REF_CLK may each be hereinafter referred to as a signal terminal. The other terminals may each be hereinafter referred to as a non-signal terminal.

In some embodiments, when the memory card 10 is inserted into the memory card adaptor 100 via the slot 101, the pair of data input terminals DIN_C and DIN_T, the pair of data output terminals DOUT_C and DOUT_T, and the reference clock terminal REF_CLK may be exposed to the outside of the memory card adaptor 100 via the signal terminal opening 107. In this regard, the signal terminals may be each independently exposed totally or partially.

In some embodiments, when the memory card 10 is inserted into the memory card adaptor 100 via the slot 101, some of the pair of data input terminals DIN_C and DIN_T, the pair of data output terminals DOUT_C and DOUT_T, and the reference clock terminal REF_CLK may be exposed to the outside of the memory card adaptor 100 via the signal terminal opening 107, and the others may not be exposed. In this regard, the exposed signal terminals may be each independently exposed totally or partially.

In some embodiments, at least the first row terminals 12 may not be exposed to the outside of the memory card adaptor 100 via the signal terminal opening 107. In this case, the memory card adaptor 100 may be configured such that the first row terminals 12 are electrically connected to terminals of a host socket via a conductor formed in the memory card adaptor 100.

Figure 2:
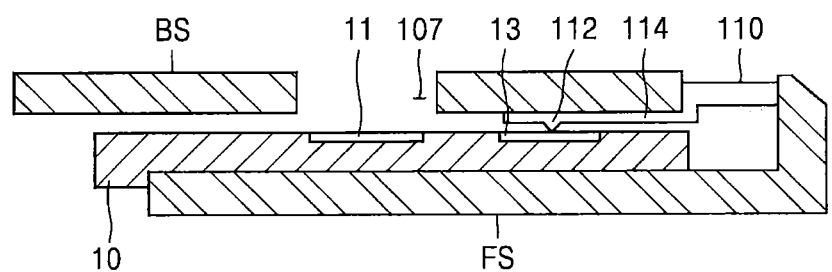
FIG. 2 is a side cross-sectional view of the memory card adaptor of FIG. 1B, taken along direction II-II' shown in FIG. 1B.

FIG. 2 is a side cross-sectional view of the memory card adaptor 100 of FIG. 1B, taken along line II-II' of FIG. 1B. FIG. 3 is an exploded perspective view illustrating the memory card adaptor 100 of FIGS. 1A and 1B, together with the memory card 10. One of ordinary skill in the art would appreciate that the inventive concept is not limited by relative sizes or distances illustrated in FIGS. 1A to 3.

Referring to FIGS. 2 and 3, signal terminal(s) 11 of the memory card 10 may be exposed to the outside via the signal terminal opening 107 of the memory card adaptor 100. As discussed above, signal terminals 11 may include, for example, DOUT_C, DOUT_I, DIN_C, DIN_I, and/or REF_CLK, as illustrated in FIG. 1C.

Non-signal terminal(s) 13 of the memory card 10 may contact a card-side terminal 112 of the memory card adaptor 100 first. The card-side terminal 112 may be electrically connected to a socket-side terminal 110 via a wiring line 114. Each card-side terminal 112 may have a corresponding socket-side terminal 110. In addition, each non-signal terminal(s) 13 may have a corresponding card-side terminal 112.

The socket-side terminal 110, the wiring line 114, and the card-side terminal 112 that correspond to one another may be configured as one body or may be configured by combining separate elements. The socket-side terminal 110, the wiring line 114, and the card-side terminal 112 may each include an electrically conductive material, and materials of the socket-side terminal 110, the wiring line 114, and the card-side terminal 112 are not particularly limited. For example, the socket-side terminal 110, the wiring line 114, and the card-side terminal 112 may each include metal. In some embodiments, the socket-side terminal 110, the wiring line 114, and the card-side terminal 112 may each include copper (Cu), aluminum (Al), nickel (Ni), iron (Fe), gold (Au), silver (Ag), platinum (Pt), zinc (Zn), tin (Sn), titanium (Ti), an alloy thereof, a coating thereof, or a combination thereof.

FIGS. 2 and 3 illustrate that the memory card 10 might not overlap the socket-side terminal 110. In other words, the memory card 10 is illustrated as overlapping only the card-side terminal 112 and electrically connected to the socket-side terminal 110 via the wiring line 114. However, according to circumstances, the memory card adaptor 100 may be configured such that the memory card 10 at least partially overlaps the socket-side terminal 110. In this case, physical distinction between the wiring line 114 and the socket-side terminal 110 and/or physical distinction between the wiring line 114 and the card-side terminal 112 may be obscured, and the socket-side terminal 110, the wiring line 114, and the card-side terminal 112 may be identified only conceptually. However, it is also considered that a connection location with a socket may be redistributed by a conductor, and such a case is within the scope of the present disclosure.

The socket-side terminals 110 may be arranged in the RL direction. Card-side terminals 112 may be configured to contact the terminals of the inserted memory card 10, and wiring lines 114 may electrically connect the socket-side terminals 110 and the card-side terminals 112 that correspond to the socket-side terminals 110. The socket-side terminals 110, card-side terminals 112, and wiring lines 114 may be accommodated within the housing 103.

The housing 103 may include an upper housing 103a and a lower housing 103b. The upper housing 103a and the lower housing 103b may be formed using thermoplastic resin such as polycarbonate, acrylonitrile butadiene styrene (ABS) resin, polybutylene terephthalate (PBT), polyethylene terephthalate (PET), polyphenylene ether (PPE), nylon, liquid crystal polymer (LCP), or a mixture thereof, by taking into account factors such as a light weight, ease of processing, and flexibility, which may be taken into account independent from each other.

In addition, although FIG. 3 illustrates each of the upper housing 103a and the lower housing 103b as one body, each of the upper housing 103a and the lower housing 103b may be formed using a plurality of blocks.

As illustrated in FIG. 2, the socket-side terminal 110 may have one surface exposed to the outside or exterior of the housing 103. Exposed surfaces of the socket-side terminals 110 may contact terminals of a socket (not shown) when the memory card adaptor 100 is inserted in the socket.

The card-side terminals 112 may be configured to contact terminals formed on a lower surface of the memory card 10, particularly, the non-signal terminal(s) 13, when the memory card 10 is inserted in the memory card adaptor 100. In some embodiments, as illustrated in FIG. 3, for smooth and reliable contact with the non-signal terminal(s) 13, the card-side terminals 112 may have central portions which may protrude or bend upwards.

The size of the memory card adaptor 100 is not specifically limited. For example, the size of the memory card adaptor 100 may correspond to the size of an SD card having outer dimensions of about 32 mm by about 24 mm and a thickness of about 2.1 mm, the size of a mini SD card having outer dimensions of about 20 mm by about 21.5 mm and a thickness of about 1.4 mm, the size of a micro SD card having outer dimensions of about 11 mm by about 15 mm and a thickness of about 1 mm, the size of a multimedia card (MMC) having outer dimensions of about 32 mm by about 24 mm and a thickness of about 1.4 mm, or the size of a reduced size multimedia card (RSMMC) having outer dimensions of about 18 mm by about 24 mm and a thickness of about 1.4 mm. However, the present disclosure is not limited by these sizes.

In addition, taking into account the size of the memory card adaptor 100, dimensions of the memory card 10 that may be inserted into the slot 101 of the memory card adaptor 100 may be less than the size of the memory card adaptor 100. For example, a card that may be inserted into the slot 101 of the memory card adaptor 100 may be a universal serial bus (USB) card, a UFS card, a SD card having outer dimensions of about 32 mm by about 24 mm and a thickness of about 2.1 mm, a mini SD card having outer dimensions of about 20 mm by about 21.5 mm and a thickness of about 1.4 mm, a micro SD card having outer dimensions of about 11 mm by about 15 mm and a thickness of about 1 mm, a MMC having outer dimensions of about 32 mm by about 24 mm and a thickness of about 1.4 mm, or a RSMMC having outer dimensions of about 18 mm by about 24 mm and a thickness of about 1.4 mm. However, the present disclosure is not limited by them.

As described above, the lower housing 103b may include the signal terminal opening 107 that may expose the signal terminal(s) 11.

Figure 4A:
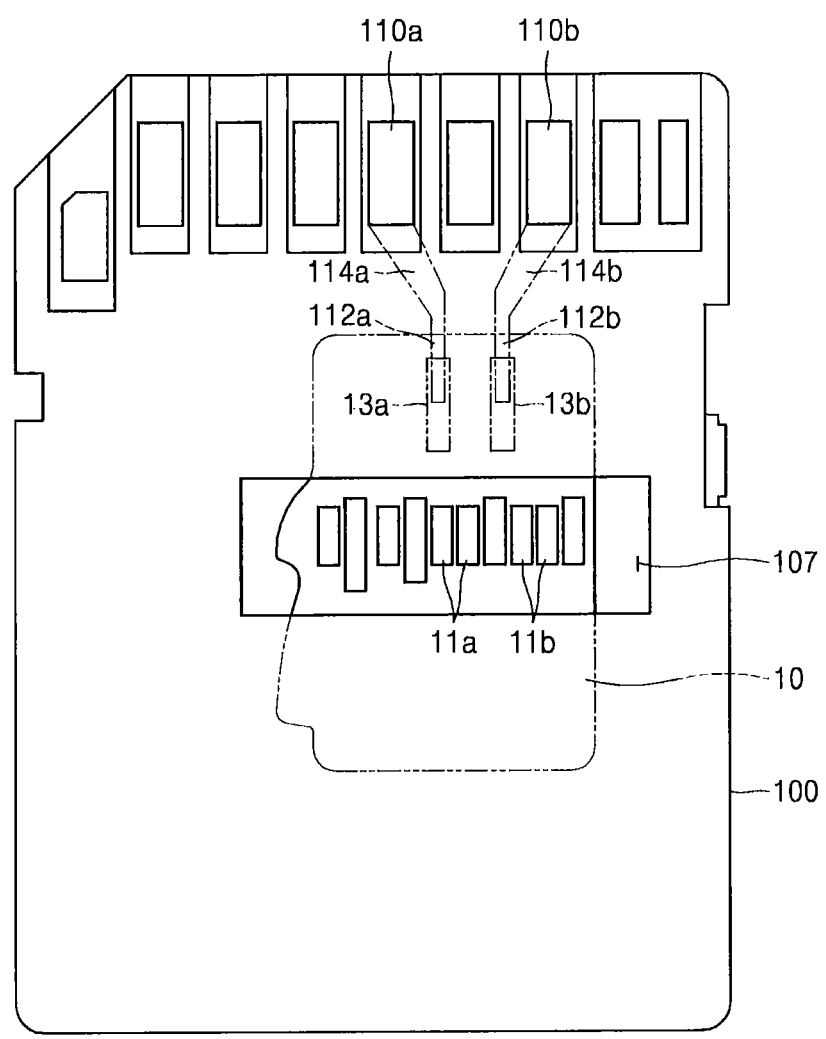
FIGS. 4A and 4B are plan views illustrating ways in which signal terminals, etc. are exposed when a memory card is inserted in a slot of a memory card adaptor.
Figure 4B:
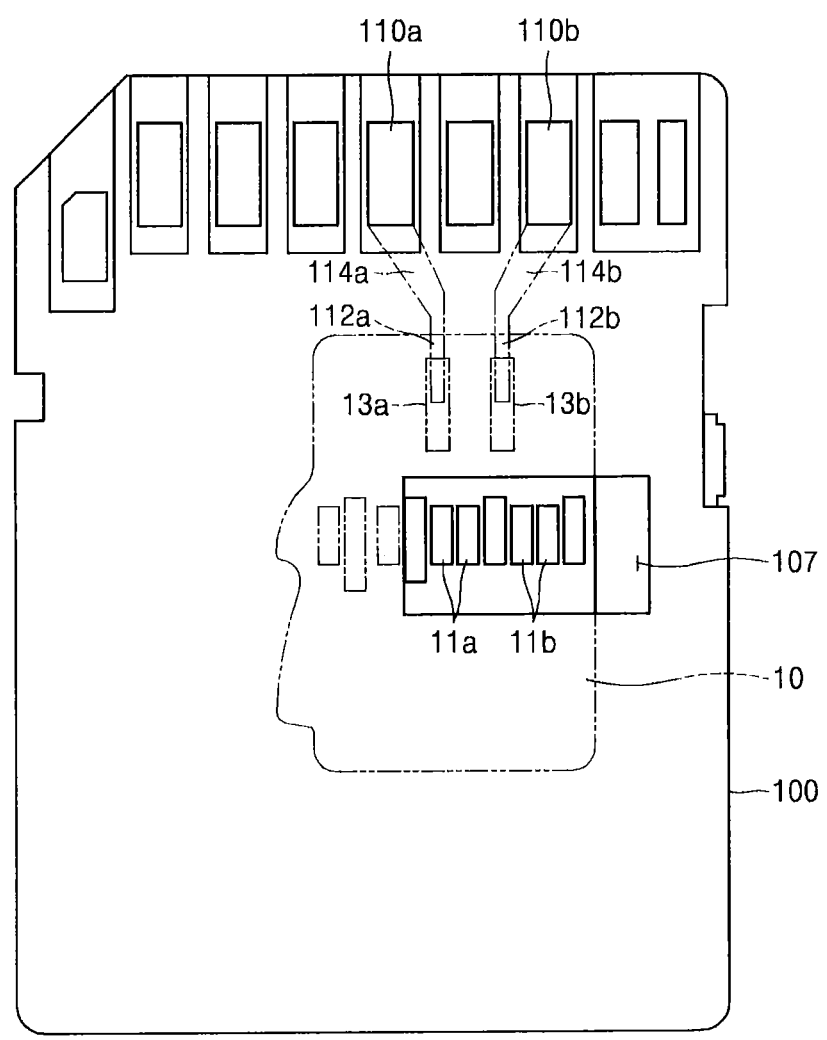

FIGS. 4A and 4B are plan views illustrating ways in which signal terminals 11a and 11b, etc. may be exposed when the memory card 10 is inserted in the slot 101.

Referring to FIGS. 4A and 1C, the signal terminal opening 107 may be configured to expose all second row terminals. That is, the ground terminals VSS, the power terminal VCCQ2 of the second voltage, data input terminals 11b, data output terminals 11a, the reference clock terminal REF_CLK, and the card detection terminal CD in a second row may all be exposed via the signal terminal opening 107.

The exposed terminals in the second row may physically contact terminals of a host socket (not shown) directly when the memory card adaptor 100 is inserted in the host socket, and when the memory card 10 is inserted into the memory card adaptor 100 via slot 101.

Terminals in a first row that are not exposed may be electrically connected to a host via card-side terminals 112a and 112b. In detail, a power terminal of a first voltage VCC 13a and a ground terminal VSS 13b, which are the terminals in the first row, may be configured to respectively contact the card-side terminals 112a and 112b. Also, the card-side terminals 112a and 112b may be electrically connected to socket-side terminals 110a and 110b via wiring lines 114a and 114b, respectively.

When the memory card adaptor 100 is inserted into the host socket, the socket-side terminals 110a and 110b may physically contact the terminals of the host socket directly and thus may be electrically connected to the terminals of the host socket.

The embodiment of FIG. 4B differs from the embodiment of FIG. 4A in that only some of the terminals in the second row may be exposed via the signal terminal opening 107. Hereinafter, repeated descriptions will be omitted, and only differences therebetween are described.

Referring to FIGS. 4B and 1C, the signal terminal opening 107 may be configured to expose terminals, from among the second row terminals, that high-speed operations may be required of. Particularly, high-speed operations may be required of the data input terminals 11b and the data output terminals 11a engaged with input and output of data, and the signal terminal opening 107 may be configured to expose the data input terminals 11b and the data output terminals 11a. Although the ground terminals VSS that are adjacent to the data input terminals 11b and the data output terminals 11a are illustrated herein as being also exposed, in some embodiments, the ground terminals VSS may not be exposed, and only the data input terminals 11b and the data output terminals 11a may be exposed via the signal terminal opening 107.

In some embodiments, the reference clock terminal REF_CLK may be separately exposed via the signal terminal opening 107.

Figure 5:
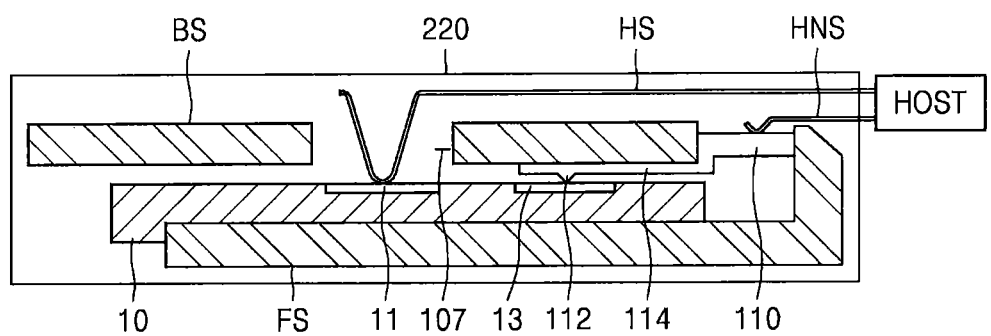
FIG. 5 is side cross-sectional view illustrating a relationship between terminals of a host socket when a memory card is inserted in a memory card adaptor, and when the memory card adaptor is accommodated in the host socket.

FIG. 5 side cross-sectional view illustrating a relationship between terminals HS and HNS of a host socket 220 when the memory card 10 is inserted in the memory card adaptor 100, and the memory card adaptor 100 is accommodated in the host socket 220.

Referring to FIG. 5, a signal terminal 11 of the memory card 10 may be exposed via the signal terminal opening 107 of the memory card adaptor 100 and may physically contact its corresponding terminal HS of the host socket 220 directly.

Also, a non-signal terminal 13 of the memory card 10 physically contacts the card-side terminal 112 of the memory card adaptor 100 first. The card-side terminal 112 may be electrically connected to the socket-side terminal 110 via the wiring line 114. In addition, the socket-side terminal 110 may physically contact its corresponding terminal HNS of the host socket 220 directly. Thus, the non-signal terminal 13 may be electrically connected to the corresponding terminal HNS of the host socket 220.

The terminals HS and HNS of the host socket 220 may each be electrically connected to a host HOST. The HOST may be, for example, a personal digital assistant (PDA), a portable computer, a web tablet, a wireless phone, a mobile phone, a digital music player, or any electronics capable of wirelessly transmitting and/or receiving information.

When terminals that need to operate at a high speed are allowed to operate by directly contacting a host, signal-transmitting characteristics may be improved, compared to a case in which, for signal transmittance, wiring such as metal pins is disposed in a memory card adaptor.

In addition, in the case of terminals that do not need to operate at a high speed, a location of a socket-side terminal may be arbitrarily adjusted through wiring, such as metal pins, in a memory card adaptor, and accordingly, power/ground electrical short problems may decrease, and compatibility with a socket of a different type may improve.

FIGS. 6 to 9 are schematic cross-sectional or perspective views of a method of inserting the memory card 10 into a memory card adaptor.

Figure 6:
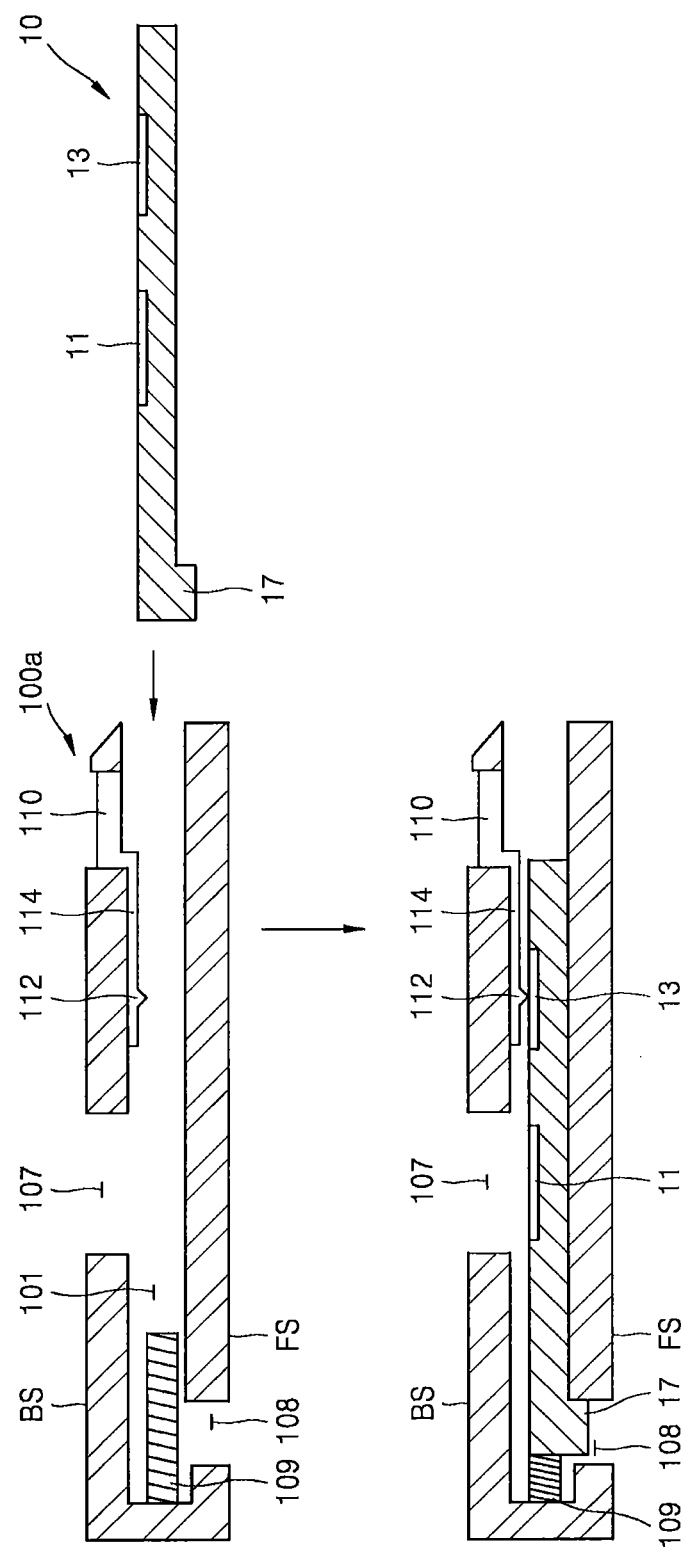
FIGS. 6 to 9 are schematic cross-sectional or perspective views of various methods of inserting a memory card into a memory card adaptor.

Referring to FIG. 6, the slot 101 may be in a memory card adaptor 100a and may be open to a front end portion of the memory card adaptor 100a. The front end portion of the memory card adaptor 100a may be an end portion on a side at which the memory card adaptor 100a may be inserted into the host socket 220 (refer to FIGS. 5 and 10).

Because the slot 101 may be open to the front end portion of the memory card adaptor 100a, the memory card 10 may be inserted in a direction from the front end portion of the memory card adaptor 100a toward a rear end portion of the memory card adaptor 100a. The direction is denoted by the arrow directed to the left in FIG. 6.

The memory card adaptor 100a may have, as described above, the signal terminal opening 107 for exposing the signal terminal(s) 11. In addition, the memory card adaptor 100a may have the card-side terminal 112 for connection to the non-signal terminal(s) 13, the wiring line 114, and the socket-side terminal 110.

An elastic body 109 that may apply appropriate elastic forces to the memory card 10 may be in the slot 101. The elastic body 109 may be, for example, a coil spring, a plate spring, a spiral spring, or the like and is not limited thereto. The elastic body 109 may facilitate removing the memory card 10 from the memory card adaptor 100a.

When the memory card 10 is inserted in the left direction of FIG. 6, a protruding knob portion 17 of the memory card 10 may be accommodated in a stopper groove 108, and thus, the memory card 10 may be fixed, temporarily or permanently, into the memory card adaptor 100a. In detail, the elastic body 109 exerts corresponding restoration forces to the right side of the memory card 10 against forces that are applied to the left side of the memory card 10, and after the knob portion 17 is accommodated in the stopper groove 108, the memory card 10 may be fixed into the memory card adaptor 100a even though the forces that are applied to the left side of the memory card 10 are removed.

When the memory card 10 is removed from the memory card adaptor 100a, the knob portion 17 may be released from the stopper groove 108 by applying vertical pressure (in FIG. 6, upward pressure) to the protruding knob portion 17, and the memory card 10 may be partially or completely separated from the memory card adaptor 100a due to the forces that are applied to the right side of the memory card 10 by the elastic body 109.

One of ordinary skill in the art would understand that the concepts illustrated shown in FIG. 6 are not limited by relative sizes or distances illustrated in FIG. 6.

Figure 7A:
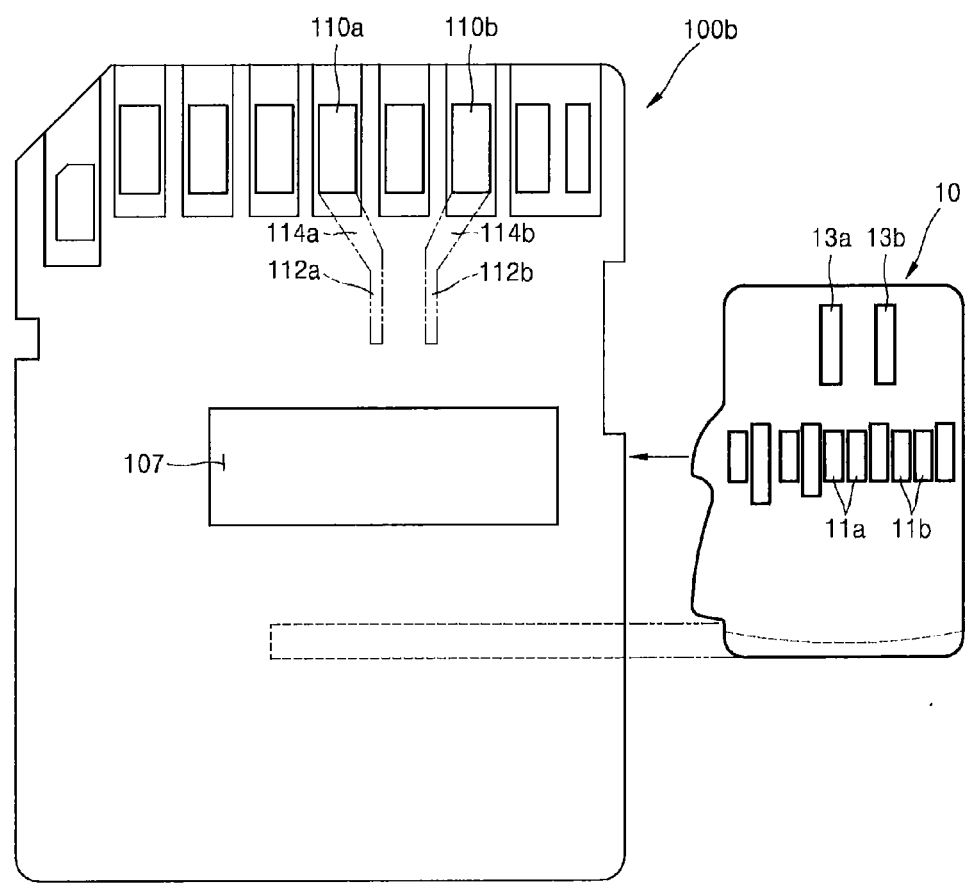
Figure 7B:
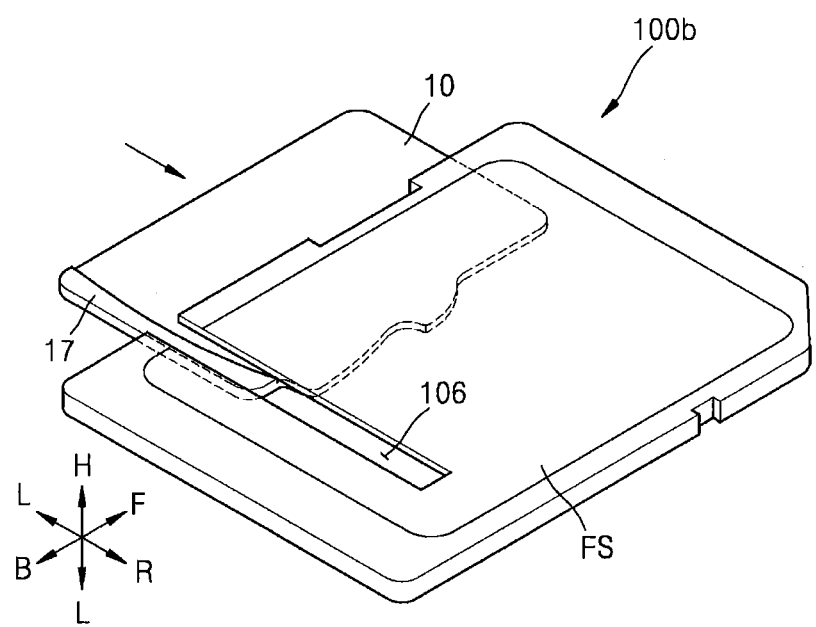

FIGS. 7A and 7B are respectively a front view and an exploded perspective view of a method of inserting the memory card 10 by using a memory card adaptor 100b according to an alternative embodiment.

FIG. 7A illustrates the first surface BS of the memory card adaptor 100b in front, and FIG. 7B mainly illustrates the second surface FS of the memory card adaptor 100b facing upwards.

Referring to FIGS. 7A and 7B, the memory card 10 may be inserted into a side direction of the memory card adaptor 100b. That is, the slot 101 may be in the memory card adaptor 100b and may be open to the side direction of the memory card adaptor 100b. The slot 101 of FIG. 7A may be open to the right side of the memory card adaptor 100b.

As illustrated in FIG. 7B, a guide groove 106 may be in the second surface FS of the memory card adaptor 100b. The guide groove 106 may extend in an insertion direction of the memory card 10 (a direction denoted by the arrow in FIG. 7B). In addition, the guide groove 106 may be connected to the slot 101.

As the memory card 10 is inserted in the memory card adaptor 100b, the knob portion 17 of the memory card 10 may move along the guide groove 106 in the LR direction. A width of the guide groove 106 in the FB direction may be appropriately selected by taking into account dimensions of the knob portion 17.

The guide groove 106 may not only guide insertion of the memory card 10 but also may expose the knob portion 17 so that forces may be easily applied to the knob portion 17 when the memory card 10 is removed from the memory card adaptor 100b. That is, when the memory card 10 is to be removed from the memory card adaptor 100b, the memory card 10 may be removed by applying forces in the opposite direction of the arrow shown in FIG. 7B to the knob portion 17.

As illustrated in FIG. 7A, the signal terminal opening 107 may be in a corresponding position of second row terminals of the memory card 10, but when it is determined that all the second row terminals are to be exposed via the signal terminal opening 107 or only some of the second row terminals are to be exposed via the signal terminal opening 107, a width of the signal terminal opening 107 may be determined accordingly. In other words, all the second row terminals may be exposed as illustrated in FIG. 4A by widening the width of the signal terminal opening 107. Alternatively, only some of the second row terminals may be exposed as illustrated in FIG. 4B by appropriately adjusting the width of the signal terminal opening 107.

Figure 8:
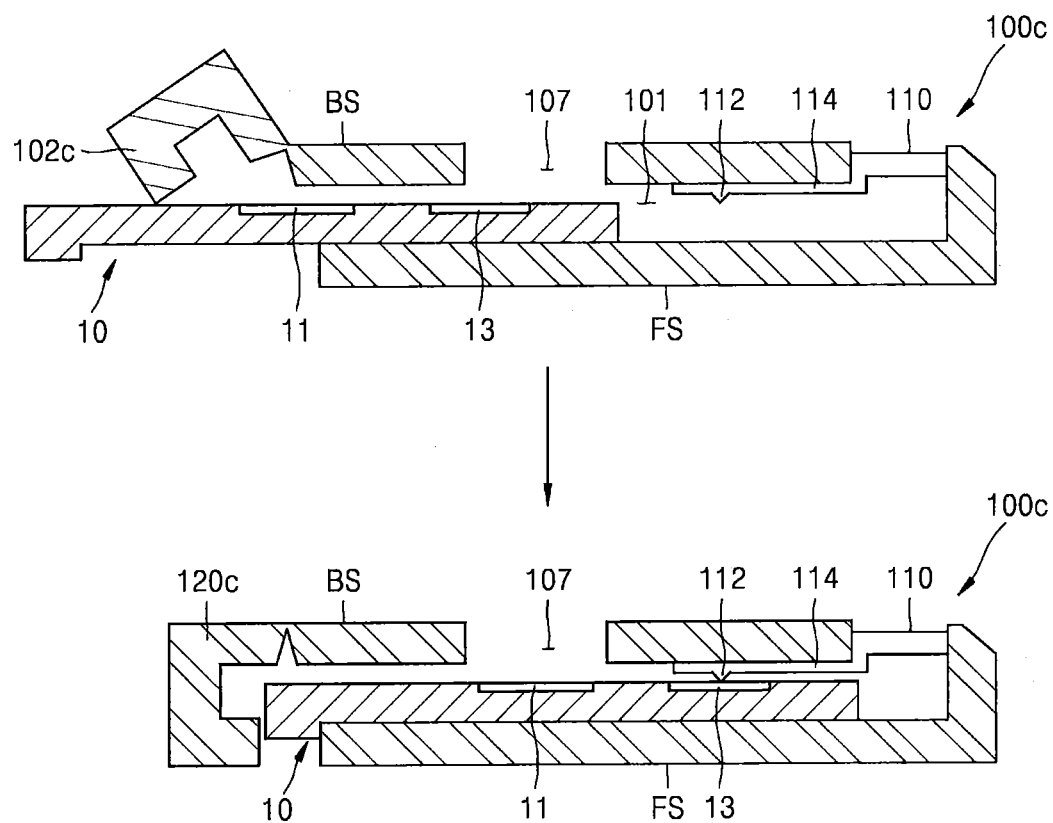

FIG. 8 is a side cross-sectional view of a method of inserting the memory card 10 by using a memory card adaptor 100c according to another embodiment.

Referring to FIG. 8, the memory card adaptor 100c may be configured to be partially bendable. Particularly, a portion of the memory card adaptor 100c that includes an end portion ("rear end portion") on the opposite side of a direction in which the memory card adaptor 100c is inserted into the host socket may be bent. Due to the bending, the slot 101 may be open so that the memory card 10 may be inserted into the slot 101.

In some embodiments, due to the bending, a portion of the memory card adaptor 100c may be bent. In this case, as illustrated in FIG. 8, a bending portion 102c that includes the read end portion may be provided. The bending portion 102c may bend back and/or upwards, and thus, the slot 101 may be open, thereby allowing the memory card 10 to be inserted into the slot 101.

In some embodiments, the housing 103 of the memory card adaptor 100c may at least partially include a flexible material, and the bending may include bending back due to deformation of the housing 103. In this regard, a portion of the housing 103 that is deformable may include, for example, a polymer material, such as silicone, that is elastic and deformable.

As illustrated in FIG. 8, due to the bending back of the bending portion 102c, the slot 101 may be open, and thus, the insertion of the memory card 10 may be allowed.

After the memory card 10 is inserted into the slot 101, the bending portion 102c may be allowed to return to its original location, and thus, accommodation of the memory card 10 may be completed.

In some embodiments, a portion of a housing which bends back may be configured to be thin so that the bending portion 102c may bend back. Selectively, an appropriate combination structure such as a hinge may be provided to allow the bending portion 102c to bend back.

Figure 9:
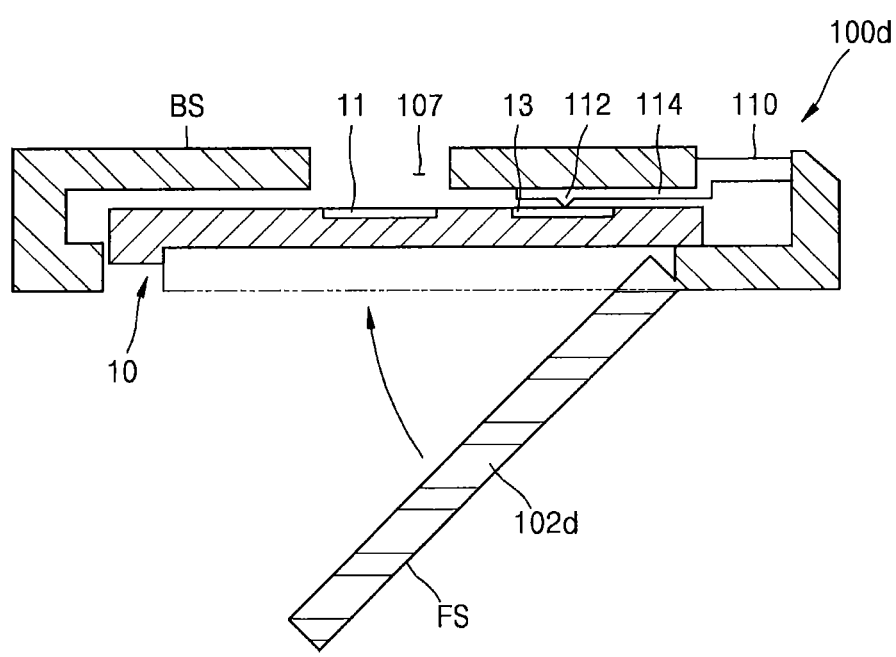

FIG. 9 is a side cross-sectional view of a method of inserting the memory card 10 by using a memory card adaptor 100d, according to another embodiment.

Referring to FIG. 9, the memory card adaptor 100d may have a lid portion 102d for opening the slot 101. The lid portion 102d may be provided on the first surface BS or the second surface FS of the memory card adaptor 100d. Although FIG. 9 illustrates the lid portion 102d as being provided on the second surface FS, the inventive concept is not limited thereto.

When the lid portion 102d is closed, the lid portion 102d may be parallel to a main surface of the memory card 10 accommodated in the slot 101. The lid portion 102d may be configured to partially combine with the first surface BS or the second surface FS and open or close due to rotation. As illustrated in FIG. 8, a portion of the lid portion 102d that combines with the first surface BS or the second surface FS may be configured such that a housing is partially thin, or may have a structure as a hinge.

Figure 10:
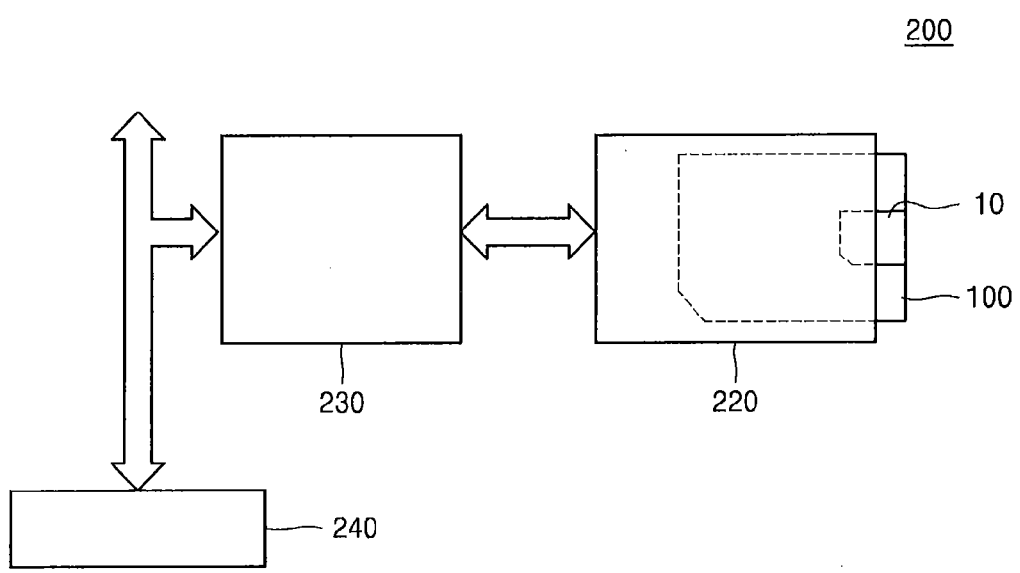
FIG. 10 is a schematic diagram of a system using a memory card adaptor according to some embodiments of the present disclosure.

FIG. 10 is a schematic diagram of a system 200 using the memory card adaptor 100 according to some embodiments.

Referring to FIG. 10, the system 200 may include the host socket 220, the memory card adaptor 100 described with reference to the above embodiments, the memory card 10 accommodated in the memory card adaptor 100, a card interface controller 230, and a host or external device 240. The host socket 220 may be provided so as to allow insertion of the memory card adaptor 100 and contact the memory card adaptor 100. The host socket 220 may be configured to be electrically connected to the socket-side terminals 110 of the memory card adaptor 100, 100a, 100b, 100c, or 100d illustrated in FIGS. 1A to 9. Although FIG. 10 representatively illustrates the memory card adaptor 100, one of ordinary skill in the art would understand that the other memory card adaptors 100a, 100b, 100c, and 100d may also be used.

The card interface controller 230 may control, through the host socket 220, data exchange with the memory card 10 in the memory card adaptor 100. In addition, the card interface controller 230 may be used to store data in the memory card 10 in the memory card adaptor 100. The host 240 may control the card interface controller 230.

Figure 11:
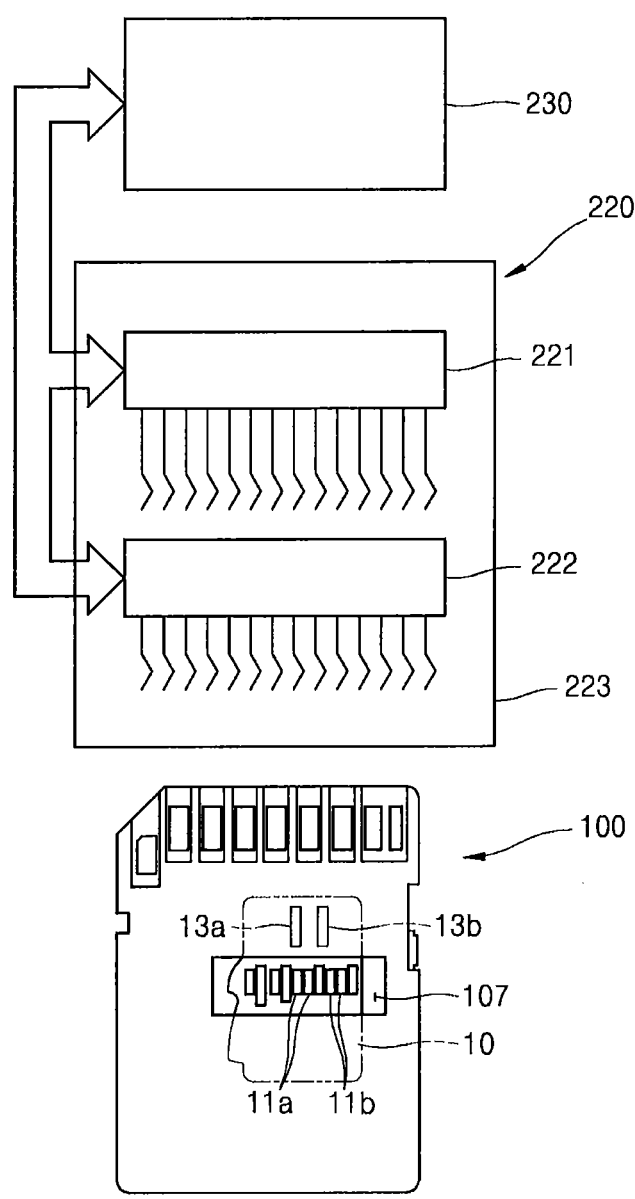
FIG. 11 is a schematic diagram illustrating a socket of FIG. 10 in detail by taking into account electrical connections with a memory card adaptor.

FIG. 11 is a schematic diagram illustrating the host socket 220 of FIG. 10 in detail by taking into account electric connection with the memory card adaptor 100.

Referring to FIG. 11, the host socket 220 where the above-described memory card adaptor 100, 100a, 100b, 100c, or 100d may be inserted is provided.

The host socket 220 may include first row corresponding socket terminals 221 that correspond to the socket-side terminals 110 (refer to FIGS. 5 to 9) of the memory card adaptor 100, 100a, 100b, 100c, or 100d, and second row corresponding socket terminals 222 that correspond to terminals such as the signal terminals 11a and 11b of the memory card 10 that are exposed via the signal terminal opening 107. Further, the host socket 220 may include a socket housing 223 that may accommodate the first row corresponding socket terminals 221 and the second row corresponding socket terminals 222.

The memory card adaptor 100, 100a, 100b, 100c, or 100d may be inserted into the socket housing 223 to operate by contacting the first row corresponding socket terminals 221 and the second row corresponding socket terminals 222.

As described above with reference to FIG. 10, the host socket 220 may be electrically connected to the card interface controller 230 capable of inputting or outputting power, signals, and/or data to or from the first row corresponding socket terminals 221 and the second row corresponding socket terminals 222.

In a memory card adaptor according to one or more of the above embodiments, terminals that need to operate at a high speed may directly contact a host, and accordingly, signal-transmitting characteristics may be improved compared to the case in which, for signal transmittance, wiring such as metal pins is disposed in a memory card adaptor.

In addition, in the case of terminals that do not need to operate at a high speed, a location of a socket-side terminal may be arbitrarily adjusted through wiring, such as metal pins, in a memory card adaptor, and accordingly, power/ground electrical short problems may decrease, and compatibility with a socket of a different type may improve.

While the concepts of the present application have been particularly shown and described with reference to embodiments thereof, it will be understood that various changes in form and details may be made therein without departing from the spirit and scope of the following claims.

What is claimed is:

1. A memory card adaptor comprising:
a housing;
a slot in the housing dimensioned to accommodate a memory card comprising a signal terminal and non-signal terminals;
a signal terminal opening in the housing, the signal terminal opening configured to at least partially expose the signal terminal when the memory card is accommodated in the slot;
at least one card-side terminal arranged so as to be capable of contacting at least one of the non-signal terminals;
at least one socket-side terminal respectively corresponding to the at least one card-side terminal and arranged so as to be capable of contacting at least one terminal of a host socket; and
a wiring line that connects the at least one card-side terminal and the at least one socket-side terminal that respectively corresponds to the at least one card-side terminal.

2. The memory card adaptor of claim 1, wherein the signal terminal opening is configured such that the terminal of the host socket is capable of physically contacting the signal terminal of the memory card directly.

3. The memory card adaptor of claim 1, wherein the signal terminal comprises a two-channel input terminal and a two-channel output terminal, and
wherein the signal terminal opening is configured to expose both of the two-channel input terminal and the two-channel output terminal.

4. The memory card adaptor of claim 3, wherein the non-signal terminals of the memory card comprise a power terminal and a ground terminal, and
wherein the at least one card-side terminal is configured to contact the power terminal or the ground terminal.

5. The memory card adaptor of claim 3, wherein the non-signal terminals of the memory card comprise a power terminal and a ground terminal, and
wherein the at least one card-side terminal is configured to correspondingly contact the power terminal and the ground terminal, respectively.

6. The memory card adaptor of claim 1, wherein the memory card comprises a micro universal flash storage (UFS) memory card.

7. The memory card adaptor of claim 1, wherein the slot is open to an end portion of the housing, and wherein the slot is configured to receive the memory card in a direction parallel to a direction in which the memory card adaptor is inserted into the host socket.

8. The memory card adaptor of claim 1, wherein the slot is open to a side portion of the housing, and wherein the slot is configured to receive the memory card in a direction perpendicular to a direction in which the memory card adaptor is inserted into the host socket.

9. The memory card adaptor of claim 1, wherein the slot is configured to be capable of being opened or closed by a lid that is parallel to a main surface of the memory card.

10. The memory card adaptor of claim 1, wherein the housing comprises an end portion on an opposite side of a portion of the memory card adaptor that is inserted into the host socket, wherein the end portion is configured to be bendable such that the memory card can be inserted into the memory card adaptor.

11. The memory card adaptor of claim 10, wherein the memory card adaptor at least partially comprises a flexible material.

12. A memory card adaptor comprising:
a first surface and a second surface which are two main surfaces of the memory card adaptor;
a slot between the first surface and the second surface and dimensioned to accommodate a micro universal flash storage (UFS) memory card that is inserted into the slot;
a signal terminal opening, in the first surface, that is capable of exposing signal terminals of the micro UFS memory card that is inserted in the slot; and
a socket-side terminal, on the first surface, that is electrically connected to a non-signal terminal of the micro UFS memory card that is inserted in the slot.

13. The memory card adaptor of claim 12, wherein the non-signal terminal of the micro UFS memory card comprises at least one of a power terminal and a first ground terminal.

14. The memory card adaptor of claim 12, wherein the signal terminal opening is configured such that the signal terminals of the micro UFS memory card are capable of physically contacting corresponding terminals of a host socket directly.

15. The memory card adaptor of claim 14, wherein the micro UFS memory card comprises second ground terminals adjacent to two sides of the signal terminals, and
the signal terminal opening is configured to expose the signal terminals and the second ground terminals.

16. A memory card adaptor comprising:
a housing comprising a slot dimensioned to receive a memory card having a first row of terminals and a second row of terminals;
an opening in the housing dimensioned to expose at least one terminal of the second row of terminals;

a card-side terminal arranged to contact at least one of the terminals of the first row of terminals; and a socket-side terminal arranged to contact at least one host socket terminal, wherein the socket-side terminal is electrically connected to the card-side terminal via a wiring line.

17. The memory card adaptor of claim 16, wherein the opening in the housing is dimensioned to expose at least one high-speed terminal of the second row of terminals.

18. The memory card adaptor of claim 16, wherein the memory card adaptor is dimensioned to be inserted into a host socket.

19. The memory card adaptor of claim 16, wherein the card-side terminal comprises a raised protrusion dimensioned to contact the at least one of the terminals of the first row of terminals.

20. The memory card adaptor of claim 16, wherein the memory card adaptor comprises a guide groove in an outer surface of the memory card adaptor.

* * * * *